United States Patent
Kim

(10) Patent No.: US 12,514,961 B2
(45) Date of Patent: Jan. 6, 2026

(54) HYALURONATE NONWOVEN FABRIC AND MANUFACTURING METHOD THEREFOR

(71) Applicant: FIBER&TECH CO., LTD., Suwon-si (KR)

(72) Inventor: Sung Il Kim, Uijeongbu-si (KR)

(73) Assignee: FIBER & TECH CO., LTD., Suwon-si (KR)

( * ) Notice: Subject to any disclaimer, the term of this patent is extended or adjusted under 35 U.S.C. 154(b) by 160 days.

(21) Appl. No.: 18/386,615

(22) Filed: Nov. 3, 2023

(65) Prior Publication Data

US 2024/0058511 A1    Feb. 22, 2024

Related U.S. Application Data

(63) Continuation of application No. PCT/KR2022/006892, filed on May 13, 2022.

(30) Foreign Application Priority Data

May 17, 2021    (KR) .................. 10-2021-0063185

(51) Int. Cl.
| | |
|---|---|
| *B01D 37/00* | (2006.01) |
| *A61L 31/04* | (2006.01) |
| *D01D 1/02* | (2006.01) |
| *D01D 1/10* | (2006.01) |
| *D01D 5/06* | (2006.01) |
| *D01D 5/26* | (2006.01) |
| *D01D 7/00* | (2006.01) |
| *D01D 10/06* | (2006.01) |
| *D01F 9/00* | (2006.01) |
| *D04H 1/4266* | (2012.01) |
| *D04H 1/4326* | (2012.01) |
| *D04H 1/558* | (2012.01) |
| *D04H 1/732* | (2012.01) |
| *D21B 1/06* | (2006.01) |
| *D21F 3/02* | (2006.01) |
| *D21F 5/00* | (2006.01) |
| *D21F 11/02* | (2006.01) |
| *D21H 13/30* | (2006.01) |

(52) U.S. Cl.
CPC ............ *A61L 31/042* (2013.01); *D01D 1/103* (2013.01); *D01D 1/106* (2013.01); *D01D 5/06* (2013.01); *D01D 10/06* (2013.01); *D01F 9/00* (2013.01); *D04H 1/4326* (2013.01); *D04H 1/558* (2013.01); *D04H 1/732* (2013.01); *D21B 1/061* (2013.01); *D21H 13/30* (2013.01); *D10B 2401/063* (2013.01); *D10B 2509/00* (2013.01)

(58) Field of Classification Search
CPC .......... B01D 37/00; D01D 1/02; D01D 1/106; D01D 5/06; D01D 5/26; D01D 7/00; D01F 9/00; D04H 1/4266; D04H 1/558; D21B 1/06; D21B 1/061; D21F 3/02; D21F 5/00; D21F 11/02; D21H 13/30
USPC ...... 264/86, 87, 115, 143, 169, 186, 211.12, 264/211.14, 211.15, 211.17; 162/157.2, 162/205, 206; 210/767
See application file for complete search history.

(56) References Cited

U.S. PATENT DOCUMENTS

| | | |
|---|---|---|
| 5,520,916 A | 5/1996 | Dorigatti et al. |
| 5,861,213 A | 1/1999 | Ohmory et al. |
| 2015/0119783 A1* | 4/2015 | Burgert .................. D01D 5/06 264/180 |

FOREIGN PATENT DOCUMENTS

| | | | |
|---|---|---|---|
| JP | 02-268765 | 11/1990 | |
| JP | 2008214226 A | * 9/2008 | ............... A61K 8/65 |
| KR | 10-0225318 | 10/1999 | |
| KR | 10-0266137 | 11/2001 | |
| KR | 10-2011-0116616 | 10/2011 | |
| KR | 10-2338355 | 12/2021 | |

OTHER PUBLICATIONS

International Search Report dated Aug. 12, 2022, issued in International Patent Application No. PCT/ KR2022/006892.

* cited by examiner

*Primary Examiner* — Leo B Tentoni
(74) *Attorney, Agent, or Firm* — PnK IP LLC

(57) ABSTRACT

The present invention relates to a hyaluronate nonwoven fabric composed of hyaluronate fibers and a manufacturing method therefor, wherein a nonwoven fabric composed of only pure hyaluronate is provided without the addition of any heterogeneous fiber, such as PVA which is a binding fiber essentially added during a wet-laid nonwoven fabric manufacturing process, so that a nonwoven fabric composed of only hyaluronate fibers with excellent human compatibility and without cytotoxicity, skin irritation, and the like can be provided, and thus can be used as patches for cosmetic patches, wet wound dressings, tissue adhesion barrier membranes, and the like.

2 Claims, 2 Drawing Sheets

HYALURONATE NONWOVEN FABRIC AND MANUFACTURING METHOD THEREFOR

CROSS REFERENCE TO RELATED APPLICATIONS

This application is a Bypass Continuation of International Application No. PCT/KR2022/006892, filed on May 13, 2022, and claims priority from and the benefit of Korean Patent Application No. 10-2021-0063185, filed on May 17, 2021, each of which is incorporated by reference for all purposes as if fully set forth herein.

BACKGROUND

Field

The present invention relates to a hyaluronate nonwoven fabric composed of only hyaluronate fibers and a method for manufacturing same, and to a hyaluronate nonwoven fabric that can be used as cosmetic patches, wet wound dressings, tissue adhesion barrier membranes, and the like.

Discussion of the Background

Hyaluronate is one of the natural polysaccharide polymers, is mainly present in the extracellular matrix (ECM) of living organisms in the form of sodium salt, and is a very important biopolymer that is responsible for retaining moisture in living organism cells due to its high water affinity (containing approximately 1,000 times its own weight in water). Due to these characteristics, hyaluronic acid is used in small amounts as a moisturizing ingredient in cosmetics, as ophthalmic eye drops, and as a gel-like tissue adhesion prevention film. Some are used in cosmetics and medical device products in the form of freeze-dried sponges.

Meanwhile, research and development on fiberizing hyaluronic acid is underway, focusing on the fact that hyaluronic acid is a linear polymer to a certain extent, and the representative fiberizing methods proposed comprise a method of dissolving hyaluronate in organic solvents such as water and DMF, followed by electrospinning to make nanofibers, or a method of using a wet spinning method of dissolving fibers in water, followed by extraction with a non-solvent such as alcohol, to manufacture fibers, and finally a method of raising the temperature to a high temperature of about 200° C. to make it fluid so as to melt-spin it.

There is a need in the industry to manufacture these hyaluronate fibers into a nonwoven fabric for use in wound dressings, cosmetic patches, anti-tissue adhesion membranes, etc. However, hyaluronate fibers to be used as nonwoven fabric raw materials have the following problems depending on the manufacturing method.

The hyaluronate nanofiber manufacturing method requires an additional removal process of organic solvents such as DMF, DMSO and FORMIC ACID, which are volatile solvents essential for nanofiber manufacturing. The method has the disadvantage that it is inconvenient to use the manufactured nanofiber nonwoven fabric alone, its physical properties are weak, and the productivity per unit time is very low, resulting in a high production cost.

In addition, the method of producing hyaluronate fibers by melt spinning has the problems that the process of hydrating hyaluronate is cumbersome, pressure-resistant equipment is required for high temperatures above 150° C., and the final manufactured fiber is monofilament and cannot be applied to nonwoven products.

The wet spinning method is generally a fiber manufacturing method that, when the fiber polymer material to be manufactured by spinning is non-thermoplastic, it is melt by using an appropriate solvent and then the fiber is solidified in a coagulating liquid. This method is widely used in the production of fibers from polysaccharide polymers such as cellulose, chitin, chitosan, and alginic acid.

However, hyaluronate has a very high affinity for water, as compared to general polysaccharide polymers, and has a high molecular weight of over 1,000,000 Da, such that the viscosity rises rapidly even at a low concentration of 1 to 2% in the process of preparing a spinning solution, making wet spinning by extrusion very difficult. In addition, it is difficult to remove excess water, which is a solvent, during the process, and, as a result, the fiber properties are weak. In addition, the concentration of solids in the solvent is low such that the process yield is very low. Therefore, it was difficult to manufacture hyaluronate fibers by using a general wet spinning process. However, as the hyaluronate production process using microbial fermentation has recently become widespread, the production of relatively low molecular weight hyaluronate has become economically feasible, which has made it possible to produce a relatively high concentration spinning solution.

Hyaluronate fibers produced by this wet spinning method may be spun into multifilament tows and cut to produce dry nonwoven fabrics such as needle punching. However, when applying needle-punched nonwoven fabric to mass production facilities, there were the problems that economic feasibility was very low due to the high loss of expensive hyaluronate fibers, and it was difficult to manufacture thin nonwoven fabric less than 100 gsm that may be used for wound dressing, cosmetic patches, and anti-tissue adhesion membranes, due to the nature of the needle-punched nonwoven fabric process.

The above information disclosed in this Background section is only for understanding of the background of the inventive concepts, and, therefore, it may contain information that does not constitute prior art.

SUMMARY

Therefore, technical problem of the present invention is to provide a method of manufacturing 100% hyaluronate nonwoven fabric with a certain level of thickness and strength that can be used in wound dressings cosmetic patches, tissue adhesion barrier membranes, and the like.

Accordingly, in order to manufacture a nonwoven fabric composed of only pure hyaluronate, the inventor of the present invention did not add any heterogeneous fiber, such as PVA which is a binding fiber essentially added during a wet-laid nonwoven fabric manufacturing process, and adjusted the solvent/non-solvent ratio in the process of beating hyaluronic acid short fibers, focusing on the characteristics of hyaluronic acid soluble in water, thereby manufacturing a nonwoven fabric.

Additional features of the inventive concepts will be set forth in the description which follows, and in part will be apparent from the description, or may be learned by practice of the inventive concepts.

According to one aspect of the invention, a hyaluronate nonwoven fabric characterized in to that it is a wet-laid nonwoven fabric composed of only hyaluronate fibers.

The wet-laid nonwoven fabric may be made of 98.0 to 99.9% by weight of hyaluronate fibers and is a wet-laid nonwoven fabric in which the hyaluronate fibers are bound by moisture and heat.

The hyaluronate fibers may be manufactured by a wet spinning process and contain 95 to 99.9% by weight of hyaluronate.

The hyaluronate fiber may contain 0.1 to 10% by weight of one or more of collagen, gelatin, vitamin C derivatives, adenosine and niacinamide.

The wet-laid nonwoven fabric may have a thickness of 0.1 to 1.0 mm, a weight of 20 to 100 g/m$^2$, and a strength of 0.5 to 1.5 kgf/m$^2$.

The wet-laid nonwoven fabric may further contain one or more of alginate fiber, carboxymethyl cellulose (CMC), chitosan fiber, poly lactic acid (PLA), polylactic glycolic acid (PLGA), poly glycolic acid (PGA) and polyvinyl alcohol (PVA).

According to another aspect of the invention, a tissue adhesion barrier membrane manufactured from the wet-laid nonwoven fabric composed of only hyaluronate fibers.

According to still another aspect of the invention, a method for manufacturing a hyaluronate nonwoven fabric, the method comprises the steps of preparing a spinning solution by dissolving hyaluronate with a molecular weight of 50,000 to 100,000 Da at a concentration of 15 to 35%; defoaming the spinning solution in a storage tank maintained at 80 to 100° C. to improve the fluidity of the spinning solution; forming a hyaluronate fiber bundle by discharging a fixed amount of the spinning solution as a coagulating solution through a nozzle by using a gear pump; passing the coagulated hyaluronate fiber bundle through an alcohol tank to clean impurities; passing the hyaluronate fiber bundle through an emulsion bath containing glycerin, followed by passing through a heater at 100 to 150° C. for drying and winding on a winder to improve the coherence between the fibers within the fiber bundle; cutting the hyaluronate fiber bundle into 1 to 5 mm by using a cutting machine; beating the cut hyaluronate fiber in a dissolution tank containing a mixture of alcohol and water at a concentration of 0.1 to 0.5%; injecting the beaten hyaluronate fiber-containing solution into a papermaking machine, followed by extracting solution to prepare a sheet shape; and compressing the sheet shape hyaluronate fiber at 100 to 120° C., followed by fusing and drying to prepare a wet-laid nonwoven fabric.

The dissolution tank in the beating step may be a dissolution tank in which alcohol and water are mixed in a volume ratio of 92:8 to 85:15.

Therefore, the present invention provides a nonwoven fabric composed of only pure hyaluronate without the addition of any heterogeneous fiber, such as PVA which is a binding fiber essentially added during a wet-laid nonwoven fabric manufacturing process, so that a nonwoven fabric composed of only hyaluronate fibers with excellent human compatibility and without cytotoxicity, skin irritation, and the like can be provided, and thus can be used as cosmetic patches, wet wound dressings, tissue adhesion barrier membranes, and the like.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
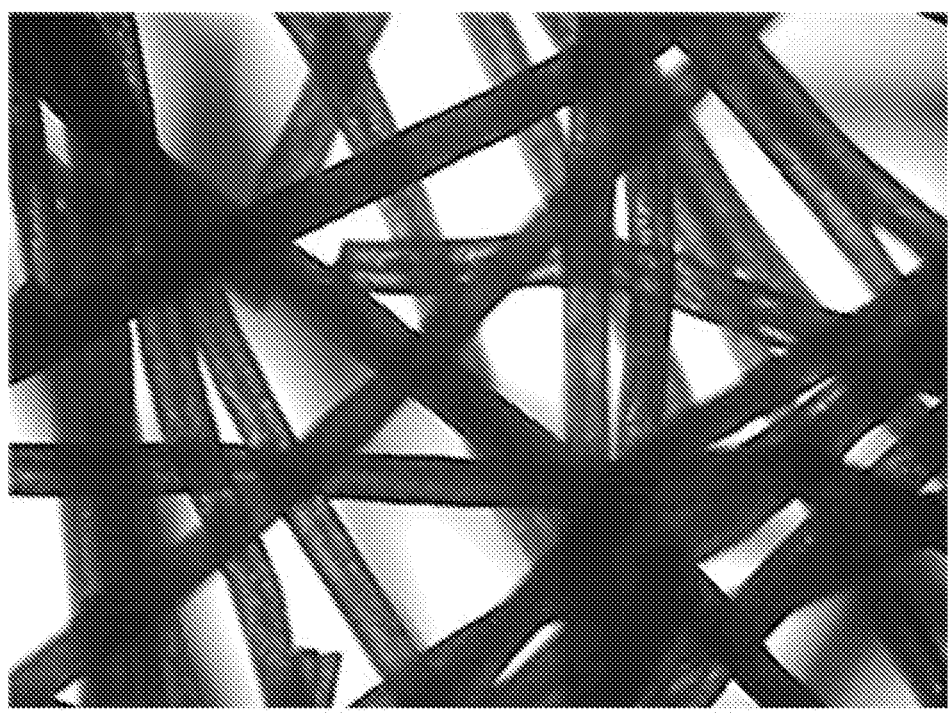
FIG. 1 is a micrograph of the nonwoven fabric of the present invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted to in an idealized or overly formal sense, unless expressly so defined herein.

Hereinafter, the present invention will be described in detail.

FIG. 1 is a micrograph of the nonwoven fabric of the present invention.

The present invention relates to a hyaluronate nonwoven fabric and a method for manufacturing same, and to a hyaluronate nonwoven fabric that can be used as cosmetic patches, wet is wound dressings, tissue adhesion barrier membranes, and the like.

According to the present invention, there is provided a wet-laid nonwoven fabric composed of only hyaluronate fibers. The wet-laid nonwoven fabric is characterized in that it is composed of only hyaluronate fibers as a component of the nonwoven fabric.

As described above, the wet-laid nonwoven fabric of the present invention consisting of 98.0 to 99.9% by weight of hyaluronate fibers is a thin nonwoven fabric of less than 100 gsm made by using the properties of hyaluronic acid that dissolves in moisture without the addition of any heterogeneous fiber such as PVA, which is an essential binding fiber during the wet-laid nonwoven fabric manufacturing process, such that the hyaluronate fibers are bound by moisture and heat. The wet-laid nonwoven fabric of the present invention has the advantage that it can exhibit excellent biocompatibility when applied to products requiring biological safety, especially implantable medical devices such as anti-adhesion barrier membranes, and, simultaneously, it can solve the shortcomings of tissue adhesion barrier membranes (e.g., SEPRAFILM) commercialized from existing hyaluronic acid films that they have weak properties, e.g., being broken when dry, and stick to each other during laparoscopic procedures.

If the hyaluronate fibers are present in an amount of less than 98.0% by weight, there is a problem that biological safety and biocompatibility may be reduced when applied to a human implantable medical device such as a tissue adhesion barrier membrane, and, if the amount of the hyaluronate fibers exceeds 99.9% by weight, it becomes difficult to achieve the present invention because a very small amount of moisture may remain during the wet-laid nonwoven fabric manufacturing process.

Methods for producing hyaluronate fiber, which is a component of the wet-laid nonwoven fabric of the present invention, conventionally comprise electrospinning, wet spinning and melt spinning. However, in the present invention, hyaluronate fiber produced by the wet spinning method is used.

The hyaluronate fibers of the present invention are characterized in that they are manufactured by a wet spinning process and contain 95 to 99.9% by weight of hyaluronate. The hyaluronate fibers are manufactured by dissolving hyaluronate (molecular weight 50,000-100,000 Da) in distilled water, stirring the mixture to prepare a spinning solution, defoaming the stirred spinning solution, applying pressure to create a 3,000-hole nozzle to extrude the solution, followed by coagulation in an ethanol coagulation solution bath, passing through an ethanol washing tank, passing through an emulsion bath containing dissolved glycerin, and passing through a heater plate for drying and winding. A more detailed manufacturing method of hyaluronate fibers will be described later.

The hyaluronate fibers manufactured in this way comprise 95 to 99.9% by weight of hyaluronate. If the amount of hyaluronate is less than 95% by weight, a large amount of unreacted calcium chloride, which is added as a cross-linking agent, remains, which may cause problems with deterioration of physical properties and biological safety. When the amount of hyaluronate exceeds 99.9% by weight, a small amount of additives such as glycerin added during the spinning process may be necessary, making it difficult to achieve the present invention.

As described above, the hyaluronate fiber of the present invention manufactured by a wet spinning process by using 100% water as a solvent does not require an additional process to remove toxic solvents, has excellent process ease, and has excellent biological safety such that it is desirable as a product for human application.

The hyaluronate fiber has a fineness of 2 to 15 denier and a fiber length of 1 to 5 mm, and is preferable in terms of flexibility and strength for manufacturing a wet-laid nonwoven fabric.

In addition, the hyaluronate fiber contains 0.1 to 10% by weight of one or more of collagen, gelatin, vitamin C derivatives, adenosine, and niacinamide, and, by additionally containing this functional materials, it is desirable to be applied to cosmetic patches.

As described above, the present invention provides a hyaluronate nonwoven fabric, which is a wet-laid nonwoven fabric composed of a plurality of the hyaluronate fibers, wherein the hyaluronate fibers are bound by moisture and heat. The hyaluronate nonwoven fabric is formed into a wet-laid nonwoven fabric by cutting a prepared hyaluronate fiber bundle to a certain length by using a cutting machine, beating the hyaluronate fibers in a dissolution tank in which alcohol and water are mixed, followed by injecting into a paper machine, extracting solution to form a sheet shape, compressing at 100 to 120° C., fusing and drying. A more detailed manufacturing method of a nonwoven fabric will be described later.

As described above, the hyaluronate nonwoven fabric of the present invention comprises hyaluronate fibers bound by moisture and heat through a wet-laid manufacturing method, and is characterized in that it contains only human compatible materials without residual harmful solvents.

The wet-laid nonwoven fabric has a thickness of 0.1 to 1.0 mm, a weight of 20 to 100 g/m$^2$, and a strength of 0.5 to 1.5 kgf/m$^2$, and is preferably applied to products such as tissue adhesion barrier membranes.

In addition, in some cases, the strength of the product may be further strengthened by adding one or more of alginate fiber, CMC, chitosan fiber, PLA, PLGA, PGA and PVA may be added to the wet-laid nonwoven fabric to further strengthen the strength of the product and adjust the decomposition rate when the product is inserted into the human body.

As described above, the hyaluronate wet-laid nonwoven fabric provided in the present invention is manufactured as a tissue adhesion barrier membrane and may replace the existing gel type and film type for use in surgical operations.

Hereinafter, a preferred example of the method for manufacturing the hyaluronate nonwoven fabric of the present invention will be described.

First, it will be explained how to spin hyaluronate fibers. A spinning solution is prepared is by dissolving hyaluronate with a molecular weight of 50,000 to 100,000 Da at a concentration of 15 to 35% by weight. It is preferable to use sodium hyaluronic acid as the hyaluronic acid salt.

If the concentration of the spinning solution is less than 15% by weight, there is a problem that the viscosity is low, thereby decreasing the coagulation rate and deteriorating the physical properties of the fibers, and, if it exceeds 35% by weight, there is a problem that the viscosity is too high, thereby reducing the spinnability.

Thereafter, the spinning solution is subjected to reduced pressure defoaming or natural defoaming in a storage tank maintained at 80 to 100° C., in order to improve the fluidity of the spinning solution.

In addition, the spinning solution of the hyaluronate fiber may contain 0.1 to 10% by weight of any one of collagen, gelatin, vitamin C derivative, adenosine and niacinamide, and is preferable for use as cosmetic patch application.

After defoaming, a fixed amount of the spinning solution is applied with pressure and discharged as a coagulating solution through a nozzle having 2000 to 3000 spinnerets by using a gear pump, thereby forming a hyaluronate fiber bundle. A 100% ethanol coagulating solution bath may also be used as a coagulating solution. Preferably, the solution may be coagulated in an ethanol coagulation bath in which 1 to 3% by weight of calcium chloride is dissolved in order to replace a part of the sodium salt of the discharged hyaluronate spinning solution with calcium salt so as to increase the coagulation rate and promote solidification of the fibers.

Thereafter, the solidified hyaluronate fiber bundle is subjected to passing through an alcohol tank to clean impurities, passing through an emulsion bath containing glycerin to improve the coherence between the fibers within the fiber bundle, passing through a heater at 100 to 150° C. for drying, and winding on a winder to prepare hyaluronate fibers.

The wet-laid nonwoven fabric of the present invention is manufactured by using the hyaluronate fiber bundle prepared in this way. First, the hyaluronate fiber bundle is cut into 1 to 5 mm by using a cutting machine. When the fiber length is less than 1 mm, there are the problems that the nonwoven fabric component fibers have weak physical properties of having a weak binding force and being easily broken, and, when the fiber length is more than 5 mm, they have a small number of binding points and, thus, have weak physical properties.

Thereafter, the cut hyaluronate fibers are added at a concentration of 0.1 to 0.5% to a dissolution tank in which alcohol and water are mixed in a volume ratio of 92:8 to 85:15, and are stirred and beaten. When the concentration of fibers in the dissolution tank during beating exceeds 0.5%, agglomeration occurs between the fibers, making it impossible to manufacture a uniform nonwoven fabric. In addition, when the volume ratio of water in the dissolution tank is more than 15%, dissolution of the beaten hyaluronate fibers is promoted, making nonwoven fabric production impossible. On the other hand, when it is less than 8%, the moisture content in the beaten hyaluronate fibers is not sufficient, which causes the problem of poor binding between the fibers during fusing and drying.

Thereafter, the beaten hyaluronate fiber-containing solution is injected into a papermaking machine and extract solution to form a sheet shape. The beaten hyaluronate fiber-containing solution is put into a papermaking machine with a mash spread and evenly dispersed, and the solution is discharged to create a hyaluronate fiber sheet shape containing both ethanol and moisture.

The sheet-shaped hyaluronate fibers containing the ethanol and moisture are compressed at 100 to 120° C. for 30 seconds, fused and dried to produce a wet-laid nonwoven fabric in which the fibers are bound by moisture and heat, thereby completing the method for manufacturing the hyaluronate nonwoven fabric of the present invention.

Hyaluronic acid has the characteristic of showing fluidity when sufficient heat is applied in a hydrolyzed state. If the heat treatment temperature is less than 100° C., the hydrated hyaluronate fiber does not have sufficient fluidity, resulting in poor binding properties and deteriorated physical properties of the nonwoven fabric. When the heat treatment temperature exceeds 120° C., there is a problem in that the hydrated hyaluronate fiber begins to decompose due to heat and pressure, changes color to brown, and breaks after drying. Therefore, care must be taken when setting the temperature during heat treatment. The following embodiments provides non-limiting examples of manufacturing the hyaluronate nonwoven fabric of the present invention.

EMBODIMENT

<Embodiment 1> Preparation of Experimental Materials

1. Spinning of Hyaluronate Fibers

Hyaluronate with a molecular weight of 50,000 Da was dissolved in 1 liter of distilled water at a concentration of 25% by weight and stirred to prepare a spinning stock solution. Thereafter, the spinning stock solution was transferred to a storage tank maintained at 100° C. and defoamed under reduced pressure. A certain amount of the spinning solution prepared in this way was extruded through a 3,000-hole nozzle with Φ=0.1 mm L/D=1 by using a gear pump under a pressure of 3 kgf/cm². The discharged hyaluronate spinning solution was coagulated in an ethanol coagulation bath containing 3% by weight of calcium chloride in order to increase the coagulation rate by replacing some of the sodium salt with calcium salt, passed through a 100% ethanol water bath, passed through an emulsion bath containing 1% glycerin to dissolved therein to improve the coherence of the fiber bundle, passed through a heater plate at 150° C. to be dried, and wound.

2. Manufacturing of Wet-Laid Nonwoven Fabric

The prepared fiber bundle was cut into 2 mm lengths with a cutting machine, and then 10 g of the cut fibers were added to 10 L of a dissolution tank in which ethanol and water were mixed at a volume ratio of 92:8 and stirred to be uniformly dispersed. 4L of the beaten solution of dissolution tank was taken and put into a papermaking machine with mash spread and evenly dispersed, and the solution was discharged to create a sheet-shaped hyaluronate nonwoven fabric with a basis weight of 35 g/m² containing both ethanol and moisture. The sheet containing ethanol and moisture was compressed and dried by using a heat press at 120° C. for 30 seconds to produce a pure hyaluronate nonwoven fabric heat-sealed by moisture.

<Embodiment 2> Evaluation of Liver Function Improvement Efficacy

The same procedure as in Embodiment 1 was carried out, except for using the coagulating solution composed of only 100% ethanol to spin the fibers. Since there is no coagulation promotion effect by calcium chloride, the physical properties of the fibers are weaker than those of Embodiment 1.

Comparative Embodiment 1

Hyaluronic acid with a molecular weight of 1,500,000 Da was dissolved at a 1% concentration in a mixed solvent of water and DMF and then subjected to electrospinning to prepare a hyaluronate nanofiber nonwoven fabric.

Comparative Embodiment 2

Figure 2:
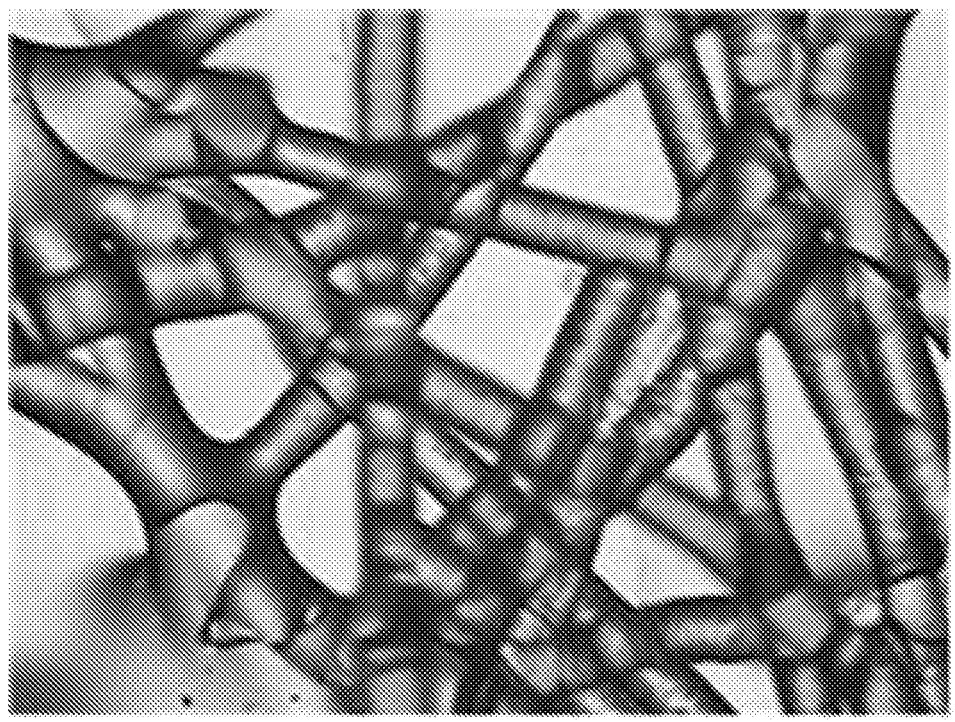
FIG. 2 is a micrograph of the nonwoven fabric of Comparative Embodiment 2.

A wet-laid nonwoven fabric was prepared in the same manner as in Embodiment 1, but the cut fibers were added to a beaten solvent of dissolution tank in which ethanol and water were mixed at a volume ratio of 80:20 and stirred. As shown in FIG. 2, since the fibers dissolved in water swell and adhere to each other, the manufactured wet-laid nonwoven fabric has the characteristic of being less flexible and easily broken, as compared to the fibrous nonwoven fabric. FIG. 2 is a micrograph of the nonwoven fabric of Comparative Embodiment 2.

The physical properties of the nonwoven fabrics of Embodiments 1 and 2 and Comparative Embodiment 1 were measured and shown in Table 1 below.

TABLE 1

|  | Embodiment 1 | Embodiment 2 | Comparative Embodiment 1 |
|---|---|---|---|
| Strength | 1.2 kgf/mm² | 0.8 kgf/mm² | 0.2 kgf/mm² |
| Elongation | 20% | 18% | 40% |
| Fiber strength | 1.1 g/d | 0.7 g/d | — |
| Thickness | 0.3 mm | 0.4 mm | 0.05 mm |

※The method of measuring the strength and elongation of nonwoven fabrics: KSK 0521, the method of measuring the fiber strength: KSK ISO 5079

The present invention can be used as cosmetic patches, wet wound dressings, tissue adhesion barrier membranes, and the like.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for manufacturing a hyaluronate nonwoven fabric, the method comprising the steps of:
   preparing a spinning solution by dissolving hyaluronate with a molecular weight of 50,000 to 100,000 Da at a concentration of 15 to 35%;
   defoaming the spinning solution in a storage tank maintained at 80 to 100° C. to improve the fluidity of the spinning solution;
   forming a hyaluronate fiber bundle by discharging a fixed amount of the spinning solution as a coagulating solution through a nozzle by using a gear pump;
   passing the coagulated hyaluronate fiber bundle through an alcohol tank to clean impurities;
   passing the hyaluronate fiber bundle through an emulsion bath containing glycerin, followed by passing through a heater at 100 to 150° C. for drying and winding on a winder to improve the coherence between the fibers within the fiber bundle;
   cutting the hyaluronate fiber bundle into 1 to 5 mm by using a cutting machine;
   beating the cut hyaluronate fiber in a dissolution tank containing a mixture of alcohol and water at a concentration of 0.1 to 0.5%;
   injecting the beaten hyaluronate fiber-containing solution into a papermaking machine, followed by extracting solution to prepare a sheet shape; and
   compressing the sheet shape hyaluronate fiber at 100 to 120° C., followed by fusing and drying to prepare a wet-laid nonwoven fabric.

2. The method for manufacturing a hyaluronate nonwoven fabric of claim 1, wherein the dissolution tank in the beating step is a dissolution tank in which alcohol and water are mixed in a volume ratio of 92:8 to 85:15.

* * * * *